(12) United States Patent
Shimizu

(10) Patent No.: US 7,630,600 B2
(45) Date of Patent: Dec. 8, 2009

(54) OPTICAL WAVEGUIDE DEVICE FOR TOUCH PANEL AND MANUFACTURING METHOD THEREOF

(75) Inventor: Yusuke Shimizu, Ibaraki (JP)

(73) Assignee: Nitto Denko Corporation, Ibaraki-Shi (JP)

( * ) Notice: Subject to any disclaimer, the term of this patent is extended or adjusted under 35 U.S.C. 154(b) by 0 days.

(21) Appl. No.: 12/324,300

(22) Filed: Nov. 26, 2008

(65) Prior Publication Data

US 2009/0136192 A1   May 28, 2009

Related U.S. Application Data

(60) Provisional application No. 61/013,688, filed on Dec. 14, 2007.

(30) Foreign Application Priority Data

Nov. 27, 2007   (JP) .............................. 2007-305699

(51) Int. Cl.
*G02B 6/26*   (2006.01)
(52) U.S. Cl. ............................. 385/31; 385/14; 385/129
(58) Field of Classification Search ....................... None
See application file for complete search history.

(56) References Cited

U.S. PATENT DOCUMENTS

| 2006/0002655 | A1 | 1/2006 | Smits |
| 2008/0124024 | A1* | 5/2008 | Shioda ........................ 385/31 |
| 2009/0010591 | A1* | 1/2009 | Iwamori et al. ............... 385/14 |

* cited by examiner

*Primary Examiner*—Sung H Pak
(74) *Attorney, Agent, or Firm*—Westerman, Hattori, Daniels & Adrian, LLP

(57) ABSTRACT

A touch panel optical waveguide device which obviates the need for an alignment operation for alignment between light emitting cores of an optical waveguide thereof and light emitting means and alignment between light receiving cores of the optical waveguide thereof and light receiving means, and to provide a production method for the optical waveguide device. A recess (5) is provided in a longitudinally middle portion of an elongated optical waveguide (W) with its wall surfaces defined by end faces of light emitting cores (3), light receiving cores (3) and over-cladding layers (4). A mount member (10) including light emitting means (12) and light receiving means (13) fixed to a single substrate (11) is mounted in the recess (5) so as to achieve alignment between the light emitting cores (3) and the light emitting means (12) and alignment between the light receiving cores (3) and the light receiving means (13).

4 Claims, 8 Drawing Sheets

OPTICAL WAVEGUIDE DEVICE FOR TOUCH PANEL AND MANUFACTURING METHOD THEREOF

RELATED APPLICATIONS

This application claims the benefit of U.S. Provisional Application No. 61/013,688, filed Dec. 14, 2007, which is hereby incorporated by reference.

BACKGROUND OF THE INVENTION

1. Field of the Invention

The present invention relates to an optical waveguide device for a touch panel, and a production method for the optical waveguide device.

2. Description of the Related Art

Touch panels are input devices for operating an apparatus by directly touching a display screen of a liquid crystal display device or the like by a finger, a special stylus or the like, and include a display which displays operation items, and detection means which detects the position (coordinates) of a portion of the display screen of the display touched by the finger or the like. Information of the touch position detected by the detection means is sent in the form of a signal to the apparatus, which in turn performs an operation specified by the touch position. Examples of the apparatus employing such a touch panel include ATMs in banking facilities, ticket venders in stations and portable game machines.

A detection device employing an optical waveguide is proposed as the detection means for detecting the finger touch position on the touch panel (see, for example, US2006/0002655A1). As shown in FIG. 10, the touch panel includes an elongated optical waveguide 70 wrapped around the periphery of a rectangular display 31. The optical waveguide 70 includes a multiplicity of cores 73 including light emitting cores and light receiving cores through which light passes. The light emitting cores and the light receiving cores are respectively located on diagonally opposite sides of the display 31. Light emitting means 12 such as a light source is connected to proximal ends of the light emitting cores 73 at one end of the elongated optical waveguide 70, and light receiving means 13 such as a light detector is connected to proximal ends of the light receiving cores 73 at the other end of the optical waveguide. Distal end faces (light emitting surfaces) of the light emitting cores 73 and distal end faces (light incident surfaces) of the light receiving cores 73 are positioned on one longitudinal side edge of the elongated optical waveguide 70, and oriented in the same direction as the display screen of the display 31 with the optical waveguide 70 being wrapped around the periphery of the display 31. Light from the light emitting means 12 passes through the light emitting cores 73, and is outputted in the form of multiple light beams from the distal end faces (light emitting surfaces) of the light emitting cores 73 in the same direction as the orientation of the display screen of the display 31. Then, the light beams are deflected in a direction parallel to the display screen of the display 31 by a rectangular frame lens (not shown) provided on upper edges of the display screen of the display 31. Further, the light beams are deflected by an opposed frame lens portion and inputted to the distal end faces (light incident surfaces) of the light receiving cores 73. Thus, the light beams travel in a lattice form on the display screen of the display 31. When a portion of the display screen of the display is touched by a finger in this state, the finger blocks some of the light beams. Therefore, the position of the screen portion touched by the finger is detected by detecting a light blocked portion by the light receiving means 13 connected to the light receiving cores 73 of the optical waveguide 70. In FIG. 10, reference characters 72 and 74 denote an under-cladding layer and an over-cladding layer, respectively.

In the case of the touch panel employing the aforementioned optical waveguide 70, the light emitting cores 73 should be aligned with the light emitting means 12 (for optical axis alignment) so that the light from the light emitting means 12 can be inputted to the light emitting cores 73 at the one end of the optical waveguide 70 wrapped around the periphery of the display 31. Further, the light receiving cores 73 should be aligned with the light receiving means 13 (for optical axis alignment) so that the light receiving means 13 can receive the light outputted from the light receiving cores 73 at the other end of the optical waveguide 70. An accurate alignment operation is troublesome with the need for precision, thereby requiring efforts and time.

SUMMARY OF THE INVENTION

In view of the foregoing, it is an object of the present invention to provide a touch panel optical waveguide device which obviates the need for the troublesome alignment operation for the alignment between the light emitting cores of the optical waveguide and the light emitting means and between the light receiving cores of the optical waveguide and the light receiving means, and to provide a production method for the optical waveguide device.

According to a first aspect of the present invention to achieve the aforementioned object, there is provided a touch panel optical waveguide device, which includes: a plurality of light emitting cores provided on a surface of an elongated base and extending in juxtaposed relation from a predetermined longitudinally middle portion of the base toward one of opposite ends of the base, and each having a proximal end and a distal end; a plurality of light receiving cores provided on the surface of the elongated base and extending in juxtaposed relation from the longitudinally middle portion of the base toward the other end of the base, and each having a proximal end and a distal end; the proximal ends of the light emitting cores being spaced from the proximal ends of the light receiving cores by the longitudinally middle portion of the base; the distal ends of the light emitting cores and the distal ends of the light receiving cores being positioned on one longitudinal side edge of the base; an over-cladding layer provided on the surface of the base except for the longitudinally middle portion as covering the light emitting cores and the light receiving cores; and a mount member including light emitting means and light receiving means fixed to a single substrate; the mount member being fixed in a recess defined on the longitudinally middle portion of the base; the light emitting means being opposed to proximal end faces of the light emitting cores; the light receiving means being opposed to proximal end faces of the light receiving cores.

According to a second aspect of the present invention, there is provided a production method for the aforementioned touch panel optical waveguide device, the production method including the steps of: forming a plurality of light emitting cores and a plurality of light receiving cores on a surface of an elongated base, the light emitting cores extending in juxtaposed relation from a predetermined longitudinally middle portion of the base toward one of longitudinally opposite ends of the base and each having a proximal end and a distal end, the light receiving cores extending in juxtaposed relation from the longitudinally middle portion of the base toward the other end of the base and each having a proximal end and a distal end, the proximal ends of the light emitting cores being spaced from the proximal ends of the light receiving cores by the longitudinally middle portion of the base, the distal ends of the light emitting cores and the distal ends of the light receiving cores being positioned on one longitudinal side edge of the elongated base; forming an over-cladding layer on the surface of the base except for the longitudinally middle portion to cover the light emitting cores and the light receiving cores; preparing a mount member including light emitting means and light receiving means fixed to a single substrate; fixing the mount member in a recess defined on the longitudinally middle portion of the base so that the light emitting means is opposed to proximal end faces of the light emitting cores and the light receiving means is opposed to proximal end faces of the light receiving cores.

In the present invention, the longitudinally middle portion of the elongated base is not strictly defined as a mid-portion of the elongated base, but is intended to include a substantial area around the mid-portion (to provide the following effects of the present invention).

In the inventive touch panel optical waveguide device, the proximal end faces of the light emitting cores are opposed to the light emitting means, and the proximal end faces of the light receiving cores are opposed to the light receiving means on the predetermined longitudinally middle portion of the elongated base. Therefore, alignment between the light emitting cores and the light emitting means and alignment between the light receiving cores and the light receiving means are achieved upon completion of the inventive touch panel optical waveguide device. Therefore, the aforementioned alignment operation can be obviated. Since the light emitting means and the light receiving means are fixed to the single substrate, synchronous driving of the light emitting means and the light receiving means can be easily achieved by forming wirings on the substrate.

In the inventive production method for the touch panel optical waveguide device, the mount member including the light emitting means and the light receiving means fixed to the single substrate is positioned on and fixed to the predetermined longitudinally middle portion of the elongated base, so that the light emitting means is opposed to the proximal end faces of the light emitting cores and the light receiving means is opposed to the proximal end faces of the light receiving cores. Therefore, the touch panel optical waveguide device can be produced with the light emitting cores in alignment with the light emitting means and with the light receiving cores in alignment with the light receiving means.

DETAILED DESCRIPTION

Embodiments of the present invention will hereinafter be described in detail with reference to the drawings.

Figure 1A:
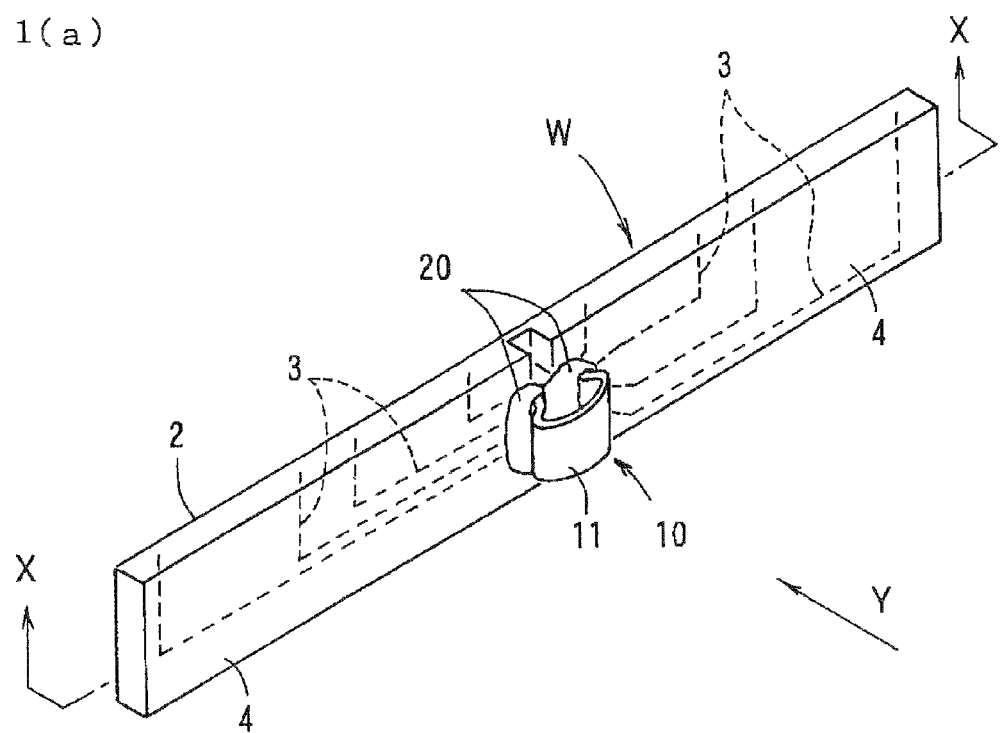
FIG. 1(a) is a perspective view and FIG. 1(b) is an X-X sectional view of FIG. 1(a), schematically illustrating an optical waveguide device according to a first embodiment of the present invention.
Figure 1B:
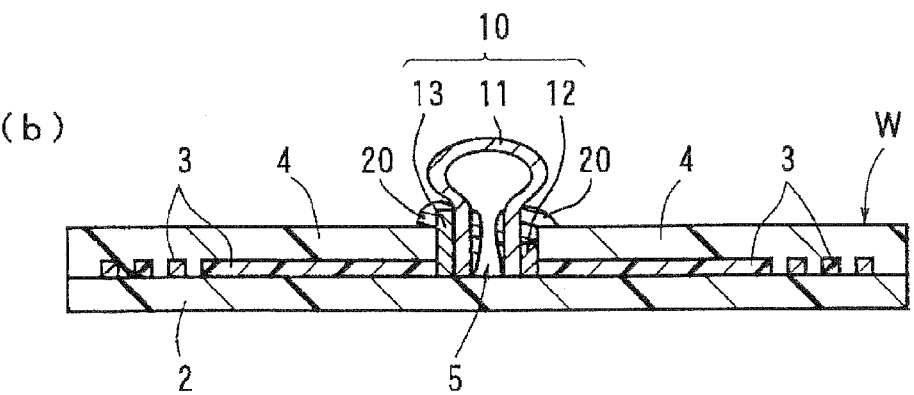
Figure 4:
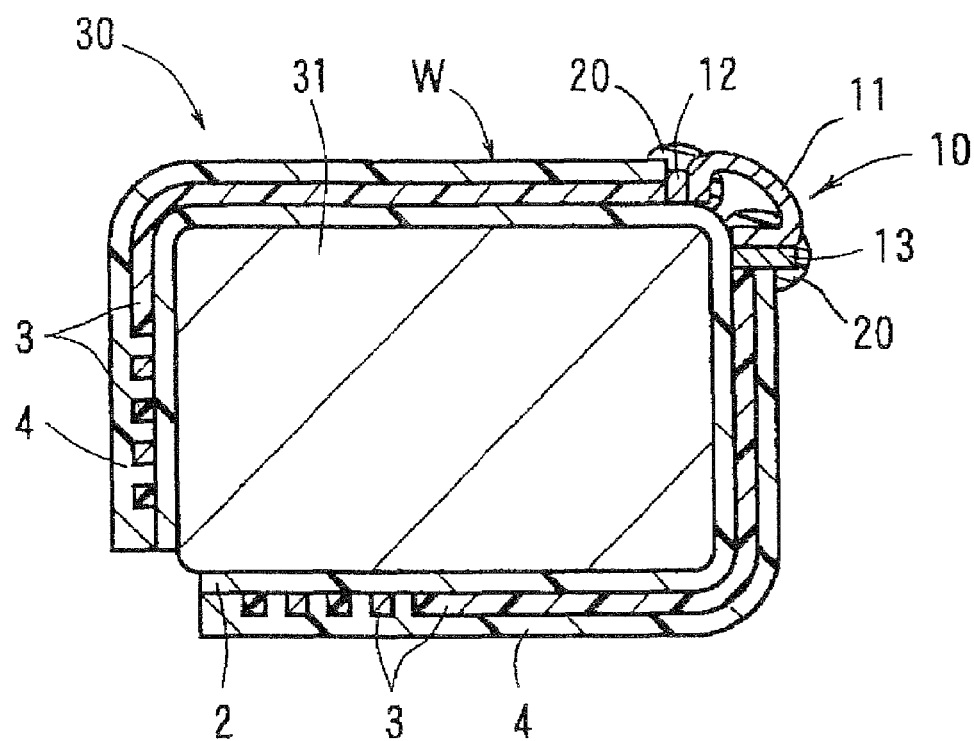
FIG. 4 is a sectional view schematically illustrating a touch panel employing the optical waveguide device.

FIGS. 1(a) and 1(b) illustrate a touch panel optical waveguide device according to a first embodiment of the present invention. The touch panel optical waveguide device according to this embodiment (hereinafter referred to simply as "optical waveguide device") is bent to be fitted on side surfaces of a display 31 and wrapped around the periphery of the display 31 as shown in FIG. 4. An unbent state of the optical waveguide device before the wrapping is shown in FIGS. 1(a) and 1(b). In the optical waveguide device, a mount member 10 including light emitting means 12 and light receiving means 13 fixed to a single substrate 11 is mounted on a longitudinally middle portion of an elongated optical waveguide W, whereby alignment between light emitting cores 3 and the light emitting means 12 and alignment between light receiving cores 3 and the light receiving means 13 are simultaneously achieved. In FIG. 1(a), the cores 3 are indicated by broken lines, and the thicknesses of the broken lines indicate the widths of the cores 3. In FIG. 1(a), the cores 3 are illustrated with some of them omitted. In FIGS. 1(a) and 1(b), reference characters 2, 4 and 20 denote an under-cladding layer, over-cladding layers and a fixing agent, respectively, which will be described later.

Figure 2A:
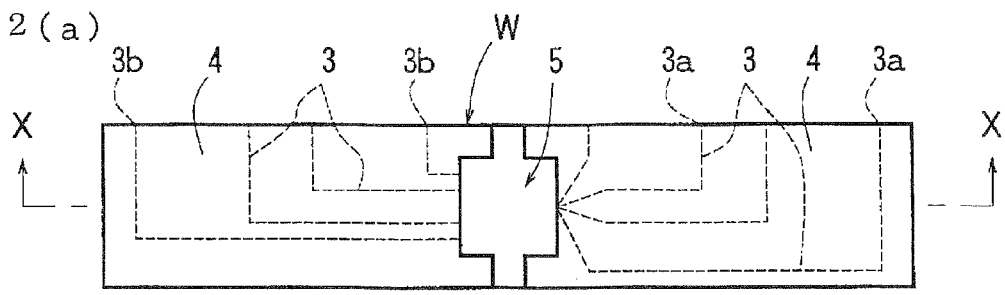
FIG. 2(a) is a front view and FIG. 2(b) is an X-X sectional view of FIG. 2(a), schematically illustrating an optical waveguide of the optical waveguide device.
Figure 2B:
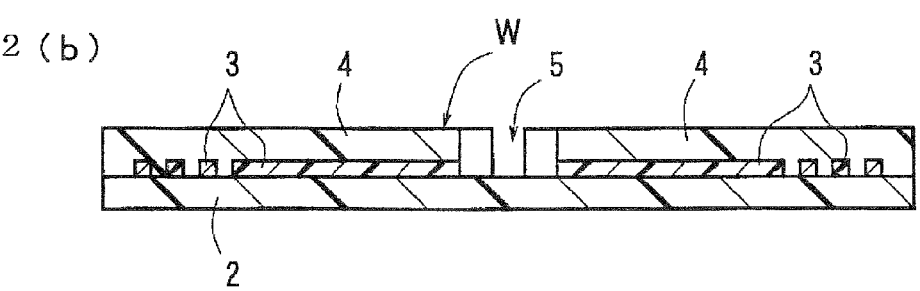

More specifically, as shown in FIG. 2(a) (which is a front view of the optical waveguide W (with the mount member 10 omitted) as seen in an arrow direction Y in FIG. 1(a)) and in FIG. 2(b) (which is a sectional view taken along a line X-X in FIG. 2(a)), the elongated optical waveguide W is configured such that the light emitting cores 3 and the light receiving cores 3 are provided on a surface of the elongated under-cladding layer 2 (base) except for a predetermined longitudinally middle portion (illustrated as corresponding to a recess 5) and extending in juxtaposed relation from the longitudinally middle portion toward longitudinally opposite ends, respectively, of the under-cladding layer 2, and each have a distal end positioned and exposed on one longitudinal side edge of the surface of the elongated under-cladding layer 2. The over-cladding layers 4 are provided on the surface of the under-cladding layer 2 except for the longitudinally middle portion (illustrated as corresponding to the recess 5) as covering the light emitting cores 3 and the light receiving cores 3. Thus, the longitudinally middle portion is covered with neither the cores 3 nor the over-cladding layers 4, so that the recess 5 is defined on the longitudinally middle portion with its bottom defined by an uncovered surface portion of the under-cladding layer 2 and with its wall surfaces respectively defined by opposed end faces of the over-cladding layers 4.

The recess 5 serves as a mount portion in which the aforementioned mount member 10 (see FIGS. 1(a) and 1(b)) is mounted. In this embodiment, the recess 5 in which the mount member 10 is mounted has a rectangular bottom shape, and has dimensions of, for example, 0.5 to 20 mm (width)×0.5 to 20 mm (length)×0.5 to 20 mm (depth). The light emitting cores 3 are located between the longitudinally middle portion (recess 5) and one of the longitudinally opposite ends of the under-cladding layer 2 (on the right side in FIGS. 2(a) and 2(b)). Proximal end faces of the light emitting cores 3 facing to one wall surface of the recess 5 (adjacent to the light emitting means 12 (see FIG. 1(b)) are centered on a single point. It is noted that a part of the over-cladding layer 4 having a thickness of about 5 to about 100 μm is present between the wall surface of the recess 5 and the proximal end faces of the light emitting cores 3 or the light receiving cores 3. In FIG. 2(a), a reference character 3a denotes distal ends of the light emitting cores 3 from which light is emitted. The light receiving cores 3 are located between the longitudinally middle portion (recess 5) and the other end of the under-cladding layer 2 (on the left side in FIGS. 2(a) and 2(b)). Light incident on distal ends 3b of the light receiving cores 3 is transmitted to the proximal end faces of the light receiving cores 3 facing to the other wall surface of the recess 5 (Adjacent to the light receiving means 13 (see FIG. 1(b)).

Figures 3A, 3B:
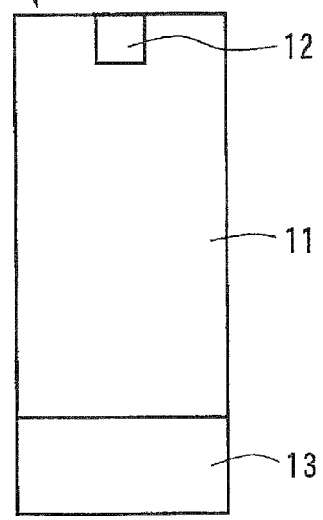
FIGS. 3(a) and 3(b) are a side view and a front view, respectively, schematically illustrating a mount member of the optical waveguide device.

The mount member 10 including the light emitting means 12 and the light receiving means 13 fixed to the single substrate 11 is mounted in the recess 5. In this embodiment, as shown in FIGS. 3(a) and 3(b), the substrate 11 is flexible, and has a rectangular shape as seen from the front side. The mount member 10 is configured such that the light emitting means 12 and the light receiving means 13 are fixed to middle portions of opposite end portions of a surface of the substrate 11. In this state, the light emitting direction of the light emitting means 12 is perpendicular to the surface of the substrate 11 (as indicated by an arrow A in FIG. 3(a)), and the light incident direction of the light receiving means 13 is perpendicular to the surface of the substrate 11 (as indicated by an arrow B in FIG. 3(a)). Further, wirings and the like (not shown) for driving the light emitting means 12 and the light receiving means 13 in synchronism are provided on the surface of the substrate 11. Examples of the flexible substrate 11 include a metal plate such as a stainless steel plate formed with an insulative layer (in this case, the light emitting means 12 and the light receiving means are fixed to a surface of the insulative layer, and the wirings and the like are provided on the surface of the insulative layer), polyimide films and epoxy films. The substrate 11 has dimensions of, for example, 0.5 to 10 mm (width)×3 to 5 mm (length)×0.025 to 0.1 mm (thickness). A VCSEL (Vertical Cavity Surface Emitting Laser), a light emitting diode, a laser diode or the like is typically used as the light emitting means 12. An ASIC (Application Specific Integrated Circuit) or the like is typically used as the light receiving means 13. The light emitting means 12 typically has dimensions of 0.1 to 1 mm×0.1 to 1 mm×0.05 to 0.5 mm (thickness). The light receiving means 13 typically has dimensions of 0.5 to 10 mm×0.5 to 10 mm×0.5 to 5 mm (thickness), and its light receiving height is 0.05 to 0.5 mm.

The mount member 10 is mounted on the elongated optical waveguide W in the following manner. With the light emitting means 12 and the light receiving means 13 of the mount member 10 facing outward and with the substrate 11 of the mount member 10 being arcuately flexed, as shown in FIGS. 1(a) and 1(b), the mount member 10 is inserted into the recess 5 present in the longitudinally middle portion of the optical waveguide W against the restoring force of the arcuately flexed substrate, and fixed by the fixing agent 20 which is composed of the same material as the over-cladding layers 4 or an adhesive. With the mount member 10 thus mounted, the proximal end faces of the light emitting cores 3 and the proximal end faces of the light receiving cores 3 are opposed to a light emitting surface of the light emitting means 12 and a light receiving surface of the light receiving means 13, respectively, with the intervention of the parts of the over-cladding layers 4 on the wall surfaces of the recess 5. Since the mount member 10 is thus mounted in the recess 5, the substrate 11 of the mount member 10 typically has the same width as the recess 5, but may have a slightly smaller width than the recess 5. The light emitting means 12 and the light receiving means 13 are automatically positioned to be opposed to the proximal end faces of the light emitting cores 3 and the proximal end faces of the light receiving cores 3, respectively, simply by thus inserting the mount member 10 into the recess 5 with the substrate 11 of the mount member 10 arcuately flexed for mounting the mount member 10.

As shown in FIG. 4, the optical waveguide device is bent at four corners of the rectangular display 31 of the touch panel 30 to be fitted on the side surfaces of the display 31 and wrapped around the periphery of the display 31. For the wrapping of the optical waveguide device, the longitudinally middle portion of the optical waveguide W mounted with the mount member 10 is positioned at one of the corners of the display 31 of the touch panel with the under-cladding layer 2 facing inward and with the mount member 10 facing outward, and the optical wave guide device is bent. With the optical waveguide device thus wrapped, two L-shaped portions of the optical waveguide device (respectively corresponding to the right half region and the left half region of the optical waveguide device in FIGS. 1(a) and 1(b)) are opposed to each other with the intervention of the display screen of the display 31. One of the opposed L-shaped portions serves as a light emitting portion, and the other L-shaped portion serves as a light receiving portion. The distal end faces (light emitting surfaces) of the light emitting cores 3 and the distal end faces (light incident surfaces) of the light receiving cores 3 are oriented in the same direction as the orientation of the display screen of the display 31. Since the alignment between the light emitting cores and the light emitting means 12 and the alignment between the light receiving cores and the light receiving means 13 are achieved in the optical waveguide device, as described above, there is no need to perform an alignment operation after the wrapping of the optical waveguide device.

The dimensions of the optical waveguide W (optical waveguide device) are properly determined according to the dimensions of the display 31 of the touch panel 30. For example, the elongated optical waveguide W has a length of about 120 to about 1200 mm, a width of about 5 to about 50 mm. The number of the light emitting cores (light receiving cores) 3 is determined according to the number of operation items to be displayed on the display screen of the display 31 and, for example, is about 20 to about 150.

Next, an exemplary production method for the inventive optical waveguide device will be described. In the production method to be hereinafter described, the mount member 10 (see FIGS. 3(a) and 3(b)) including the light emitting means 12 and the light receiving means 13 fixed to the single substrate 11 and the elongated optical waveguide W (see FIGS. 2(a) and 2(b)) are separately produced, and then the mount member 10 is mounted on the longitudinally middle portion of the optical waveguide W.

The production of the mount member 10 will be described with reference to FIGS. 3(a) and 3(b). Wirings for driving the light emitting means 12 and the light receiving means 13 in synchronism, a pad on which the light emitting means 12 is mounted, and a pad on which the light receiving means 13 is mounted are first formed on the substrate 11 by photolithography or printing (this step is not shown). Then, the light emitting means 12 and the light receiving means 13 are respectively mounted on and fixed to the pads thus formed. In this manner, the mount member 10 is produced.

In the production of the optical waveguide W to be used for the inventive optical waveguide device, a planar base 1 (see FIG. 5(*a*)) to be used for the production of the optical waveguide W is first prepared. Exemplary materials for the base 1 include glass, quartz, silicon, resins and metals. The base has a thickness of, for example, 20 µm (for a film base 1) to 5 mm (for a plate base 1).

In turn, as shown in FIG. 5(*a*), a photosensitive resin layer for formation of the under-cladding layer 2 is formed on a predetermined region of the base 1, and exposed to radiation. Then, the photosensitive resin layer is heat-treated for completion of a photoreaction. The resulting photosensitive resin layer serves as the under-cladding layer 2. The under-cladding layer 2 (photosensitive resin layer) typically has a thickness of 10 to 1000 µm.

For the formation of the photosensitive resin layer for the formation of the under-cladding layer 2, a varnish prepared by dissolving a photosensitive resin in a solvent is applied onto the base 1, and then dried by a heat treatment. The application of the varnish is achieved, for example, by a spin coating method, a dipping method, a casting method, an injection method, an ink jet method or the like. The subsequent heat treatment is performed at 50° C. to 120° C. for 10 to 30 minutes. Examples of the radiation for the exposure include visible light, ultraviolet radiation, infrared radiation, X-rays, α-rays, β-rays and γ-rays. Preferably, the ultraviolet radiation is used. The use of the ultraviolet radiation permits irradiation at a higher energy to provide a higher curing speed. In addition, a less expensive smaller-size irradiation apparatus can be employed, thereby reducing production costs. Examples of a light source for the ultraviolet radiation include a low-pressure mercury-vapor lamp, a high-pressure mercury-vapor lamp and an ultra-high-pressure mercury-vapor lamp. The dose of the ultraviolet radiation is typically 10 to 10000 mJ/cm$^2$, preferably 50 to 3000 mJ/cm$^2$. The subsequent heat treatment is performed at 80° C. to 250° C., preferably at 100° C. to 200° C., for 10 seconds to two hours, preferably for five minutes to one hour.

Next, as shown in FIG. 5(*b*), a photosensitive resin layer for formation of the cores 3 is formed on a surface of the under-cladding layer 2, and exposed to radiation via an exposure mask formed with an opening pattern corresponding to a core pattern. Then, the resulting photosensitive resin layer is heat-treated for completion of a photoreaction. A development process is performed by dissolving away an unexposed portion of the photosensitive resin layer with the use of a developing agent. Thus, portions of the photosensitive resin layer remaining on the under-cladding layer 2 are defined in the core pattern. Then, the developing solution in the remaining portions of the photosensitive resin layer is removed by a heat treatment. The remaining portions of the photosensitive resin layer serve as the cores 3 (with a predetermined longitudinally middle portion of the under-cladding layer 2 being uncovered with the cores 3). The cores 3 (photosensitive resin layer) typically each have a thickness of 10 to 100 µm, and a width of 8 to 50 µm.

The formation of the photosensitive resin layer for the formation of the cores 3 is achieved in the same manner as the formation of the photosensitive resin layer for the formation of the under-cladding layer 2 described with reference to FIG. 5(*a*). A material for the cores 3 has a greater refractive index than the materials for the aforementioned under-cladding layer 2 and over-cladding layers 4 to be described later (see FIG. 5(*d*)). The refractive index may be adjusted, for example, by selection of the types of the materials for the under-cladding layer 2, the cores 3 and the over-cladding layers 4 and adjustment of the composition ratio thereof. The exposure and the subsequent heat treatment are achieved in the same manner as for the formation of the under-cladding layer 2 described with reference to FIG. 5(*a*). Exemplary methods for the development process include an immersion method, a spray method and a puddle method. Examples of the developing solution to be used include an organic solvent and an organic solvent containing an alkaline aqueous solution. The developing solution and conditions for the development are properly selected depending on the composition of the photosensitive resin. The heat treatment subsequent to the development is typically performed at 80° C. to 120° C. for 10 to 30 minutes.

Subsequently, a molding die 40 which has a molding recess having a molding surface conformable to the surface geometry of the over-cladding layers 4 (see FIG. 5(*d*)) as shown in FIG. 5(*c*) and is made of quartz (a material pervious to radiation such as ultraviolet radiation) is prepared. The molding recess of the molding die 40 is positioned at a predetermined position on the surface of the base 1. At this time, a molding cavity S is defined by the molding surface of the molding recess and the surfaces of the under-cladding layer 2 and the cores 3. A photosensitive resin for formation of the over-cladding layers 4 is injected into the molding cavity S from an injection port 41 of the molding die 40, and then exposed to radiation such as ultraviolet radiation through the molding die 40. The exposure is achieved in the same manner as for the formation of the under-cladding layer 2 described with reference to FIG. 5(*a*).

In turn, as shown in FIG. 5(*d*), the resulting product is demolded and then heat-treated. Thus, the over-cladding layers 4 are formed over the cores 3 with the predetermined longitudinally middle portion of the under-cladding layer 2 (corresponding to the recess 5) being uncovered therewith. The heat treatment and the like are achieved in the same manner as for the formation of the under-cladding layer 2 described with reference to FIG. 5(*a*). The over-cladding layers 4 typically each have a thickness of 300 to 1000 µm (as measured from the surfaces of the cores 3). Upon the formation of the over-cladding layers 4, neither the cores 3 nor the over-cladding layers 4 cover the longitudinally middle portion of the under-cladding layer 2, but the recess 5 is defined on the longitudinally middle portion with its bottom defined by the uncovered surface portion of the under-cladding layer 2 and with its wall surfaces defined by opposed end faces of the over-cladding layers 4.

Subsequently, as shown in FIG. 5(*e*), the base 1 is separated from the under-cladding layer 2. For the separation, for example, the base 1 is fixed to a vacuum suction stage (not shown) by air suction with its lower surface in contact with the vacuum suction stage. Then, upper surfaces of the over-cladding layers 4 are held by suction by means of a vacuum suction device (not shown) and, in this state, a suction portion of the device is lifted. Thus, the under-cladding layer 2 of the optical waveguide W is separated together with the cores 3 and the over-cladding layers 4 bonded thereto from the base 1. Here, adhesion between the base 1 and the under-cladding layer 2 is set at a lower level than adhesion between the over-cladding layers 4 and the cores 3, adhesion between the over-cladding layers 4 and the under-cladding layer 2 and adhesion between the cores 3 and the under-cladding layer 2 by properly selecting the materials. This facilitates the separation.

Thereafter, a portion of the resulting product later serving as an elongated optical waveguide W is cut out by stamping with a cutting die. Thus, the elongated optical waveguide W (see FIGS. 2(a) and 2(b)) is obtained.

Figure 5A:
FIGS. 5(a) to 5(f) are explanatory diagrams schematically showing a production method for the optical waveguide device.
Figure 5B:
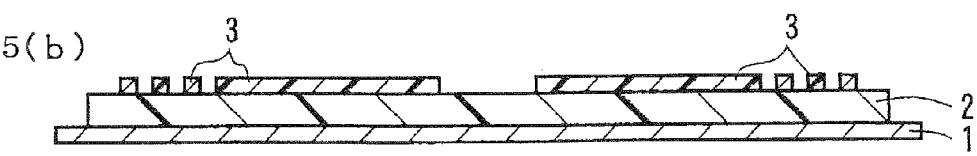
Figure 5C:
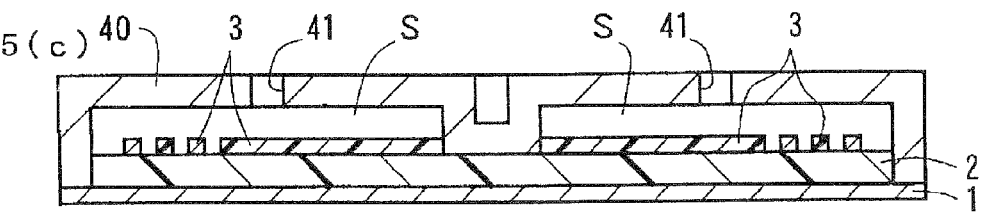
Figure 5D:
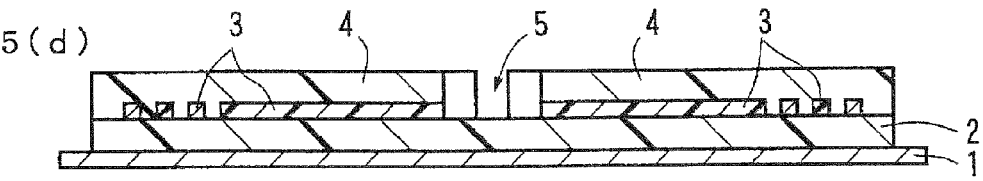
Figure 5E:
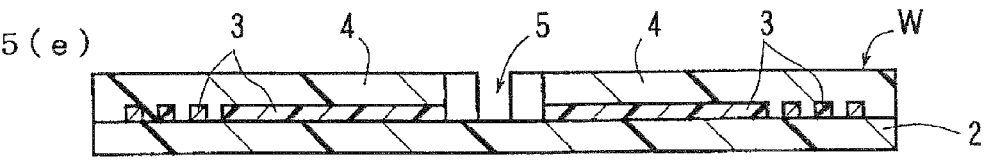
Figure 5F:
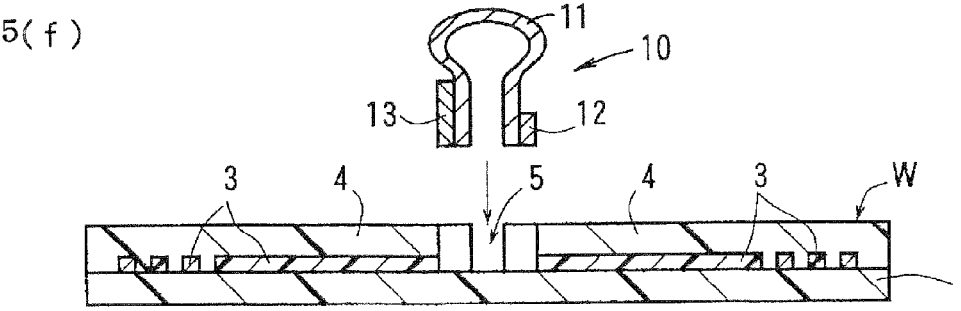

Then, as shown in FIG. 5(f), the substrate 11 of the mount member 10 is flexed with the light emitting means 12 and the light receiving means 13 of the mount member 10 facing outward and, in this state, the mount member 10 is inserted into the recess 5 defined on the longitudinally middle portion of the optical waveguide W. At this timer proximal end faces of light emitting cores 3 and proximal end faces of light receiving cores 3 respectively facing to the wall surfaces of the recess 5 are opposed to the light emitting surface of the light emitting means 12 and the light receiving surface of the light receiving means 13, respectively, with the intervention of parts of the over-cladding layers 4. In this state, the light emitting means 12 and the light receiving means 13 are respectively kept in press contact with the wall surfaces of the recess 5 due to the resilience of the flexed substrate 11 of the mount member 10, whereby the mount member 10 is temporarily fixed in the recess 5. Then, the fixing agent 20 composed of the same material as the over-cladding layers 4 or an adhesive is applied to peripheral portions of the light emitting means 12 and the light receiving means 13 and cured, whereby the mount member 10 is fixed to the optical waveguide W. Thus, the elongated optical waveguide device shown in FIGS. 1(a) and 1(b) is obtained.

Figure 6A:
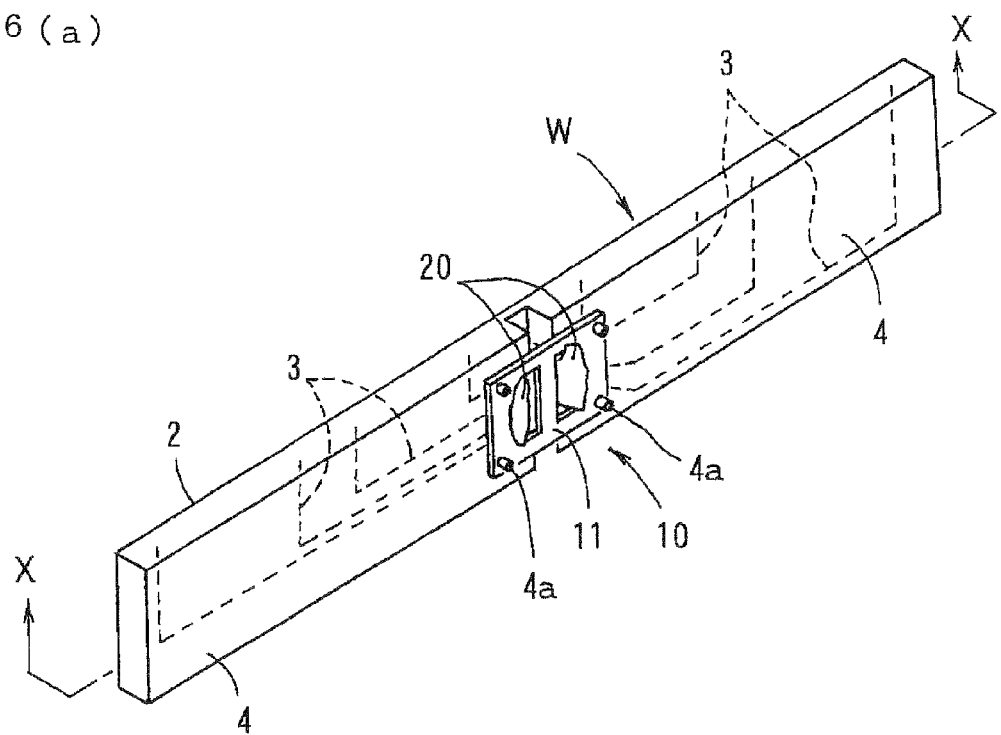
FIG. 6(a) is a perspective view and FIG. 6(b) is an X-X sectional view of FIG. 6(a), schematically illustrating an optical waveguide device according to a second embodiment of the present invention.
Figure 6B:
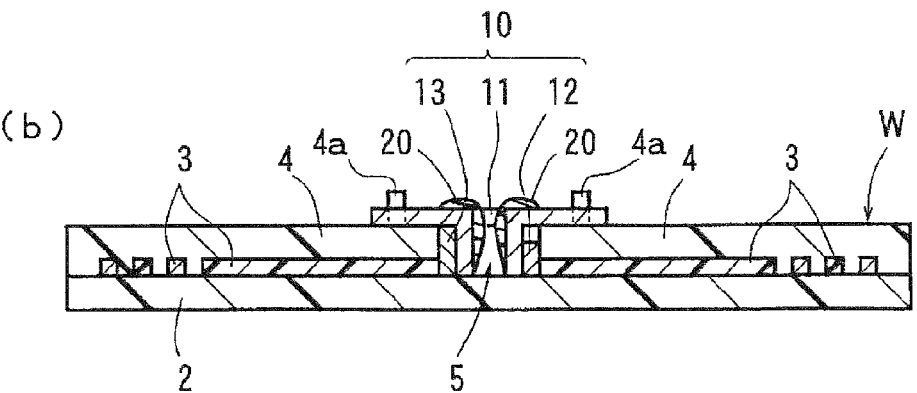

FIGS. 6(a) and 6(b) illustrate an optical waveguide device according to a second embodiment of the present invention. The optical waveguide device of this embodiment has substantially the same construction as that of the first embodiment, except that the shape of the mount member 10 is different and the shape of the optical waveguide W on which the mount member 10 is mounted is correspondingly different as will be described below. Like components are denoted by like reference characters.

Figures 7A, 7B:
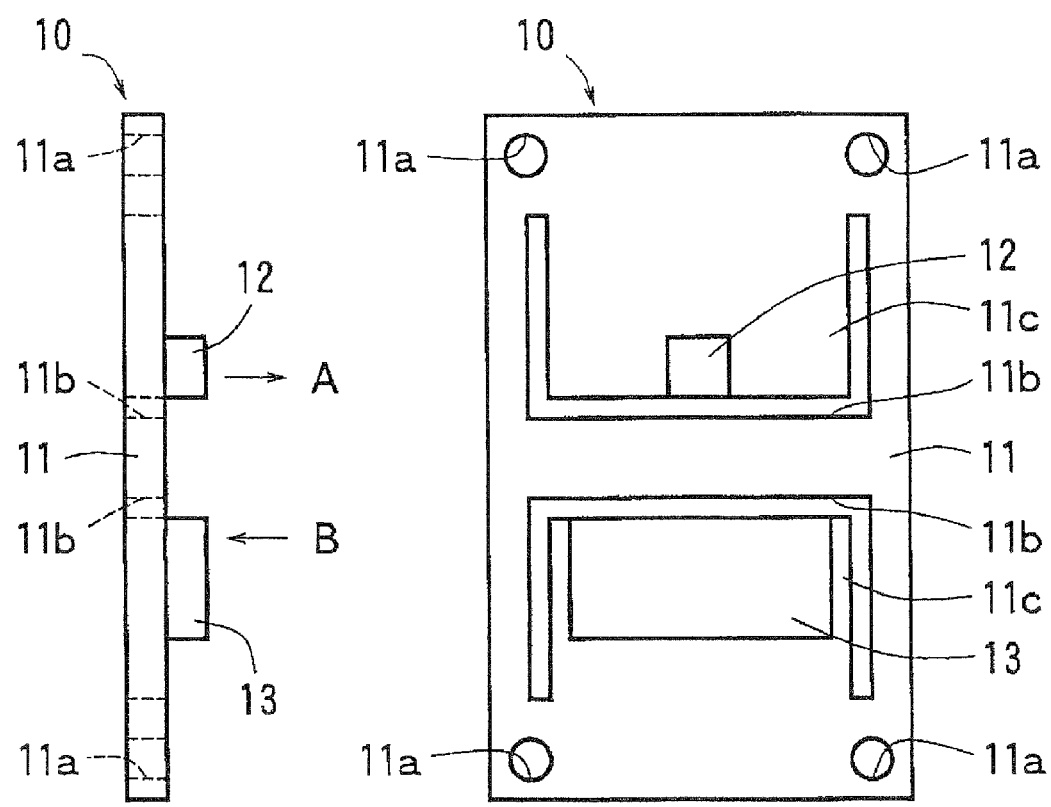
FIGS. 7(a) and 7(b) are a side view and a front view, respectively, schematically illustrating a mount member of the optical waveguide device.

As shown in FIGS. 7(a) and 7(b), the mount member 10 according to this embodiment includes a flexible substrate 11 having a rectangular shape as seen from the front side. The substrate 11 has through-holes 11a formed in four corners thereof, and two open-square cut-away portions 11b provided in a center portion thereof in opposed relation with open sides of the open-square cut-away portions facing away from each other. The light emitting means 12 and the light receiving means 13 are respectively fixed to middle portions of distal edge portions of surfaces of tongues 11c defined by the open-square cut-away portions 11b. In this state, the light emitting direction of the light emitting means 12 is perpendicular to the surface of the substrate 11 (as indicated by an arrow A in FIG. 7(a)), and the light incident direction of the light receiving means 13 is perpendicular to the surface of the substrate 11 (as indicated by an arrow B in FIG. 7(a)). Examples of the flexible substrate 11 include a metal plate such as a stainless steel plate formed with an insulative layer, polyimide films and epoxy films. The substrate 11 has dimensions of, for example, 2 to 40 mm (width)×2 to 40 mm (length)×0.025 to 0.1 mm (thickness). The through-holes 11a formed in the four corners of the substrate 11 each have an inner diameter of, for examples 0.1 to 5 mm. The open-square cut-away portions 11b each have a cut width of, for example, 0.05 to 1 mm. The tongues 11c each have dimensions of, for example, 0.5 to 10 mm (width)×0.5 to 10 mm (length).

As shown in FIGS. 6(a) and 6(b), the optical waveguide W on which the mount member 10 is mounted has four posts 4a provided on surface portions of the over-cladding layers 4 adjacent to an opening of the recess 5 present on the longitudinally middle portion. The posts 4a are inserted through the through-holes 11a provided in the four corners of the substrate 11 of the mount member 10. For formation of the posts 4a, a molding die 40 (see FIG. 5(c)) having post formation molding recesses provided in the molding surface may be used when the over-cladding layers 4 are formed. The posts 4a each have, for example, an outer diameter of 0.1 to 5 mm and a height of 0.5 to 5 mm.

The mount member 10 is mounted on the elongated optical waveguide W by inserting the posts 4a provided on the over-cladding layers 4 into the through-holes 11a of the substrate 11 of the mount member 10 with the light emitting means 12 and the light receiving means 13 of the mount member 10 facing toward the recess 5, then bending the tongues 11c in the recess 5, and bringing the light emitting surface of the light emitting means 12 and the light receiving surface of the light receiving means 13 into opposed relation to the proximal end faces of the light emitting cores 3 and the proximal end faces of the light receiving cores 3, respectively, facing to the wall surfaces of the recess 5 with the intervention of the parts of the over-cladding layers 4. Then, the fixing agent 20 composed of the same material as the over-cladding layers 4 or an adhesive is applied to the peripheral portions of the light emitting means 12 and the light receiving means 13, and cured to fix the mount member 10 to the optical waveguide W. In this manner, the optical waveguide device shown in FIGS. 6(a) and 6(b) is obtained. Thus, the mount member 10 can be easily and properly mounted in the recess 5. For the proper mounting of the mount member, the tongues 11c of the mount member 10 typically each have the same width as the recess 5. Thus, the light emitting means 12 and the light receiving means 13 can be automatically positioned in opposed relation to the proximal end faces of the light emitting cores 3 and the proximal end faces of the light receiving cores 3, respectively, when the tongues 11c are bent in the recess 5.

Figure 8A:
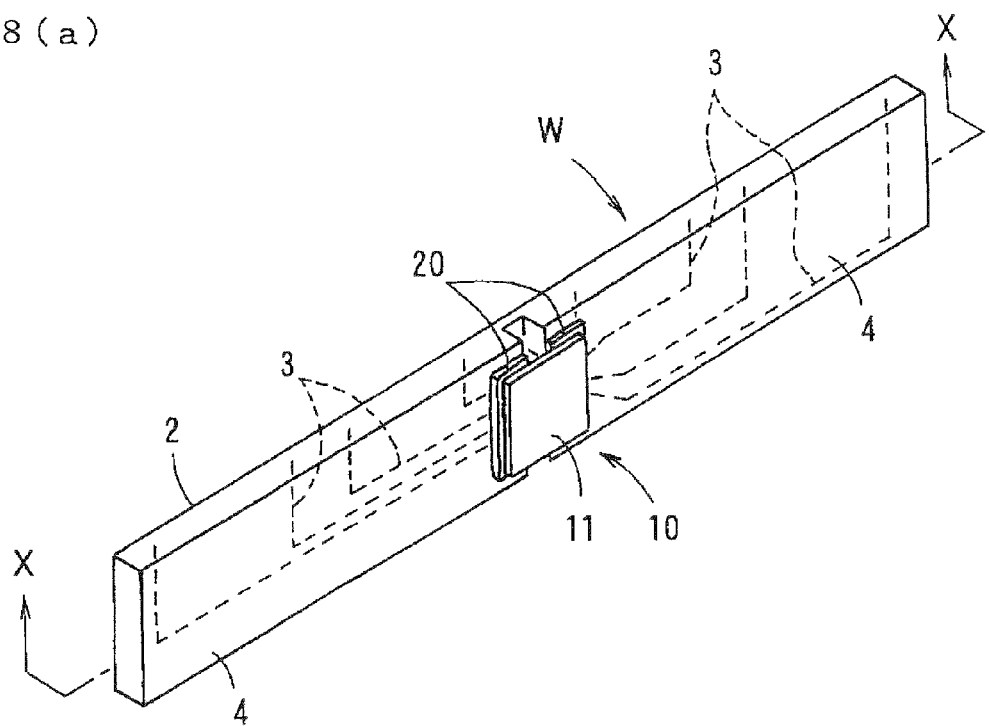
FIG. 8(a) is a perspective view and FIG. 8(b) is an X-X sectional view of FIG. 8(a), schematically illustrating an optical waveguide device according to a third embodiment of the present invention.
Figure 8B:
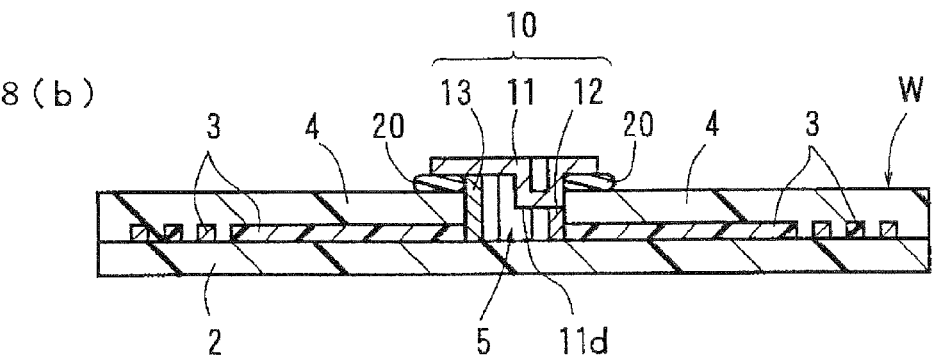

FIGS. 8(a) and 8(b) illustrate an optical waveguide device according to a third embodiment of the present invention. The optical waveguide device of this embodiment has substantially the same construction as that of the first embodiment, except that the shape of the mount member 10 is different as will be described below. Like components are denoted by like reference characters.

Figure 9:
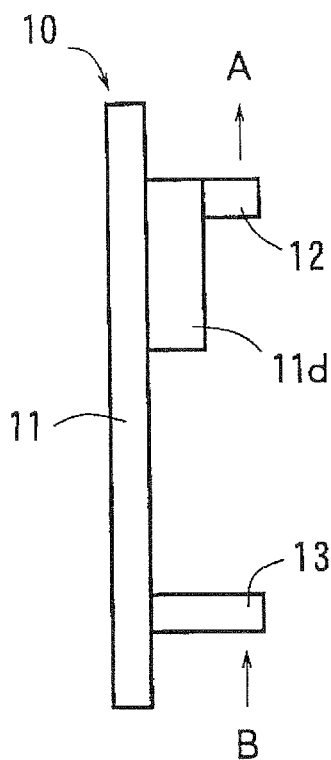
FIGS. 9(a) and 9(b) are a side view and a front view, respectively, schematically illustrating a mount member of the optical waveguide device.
Figure 9:
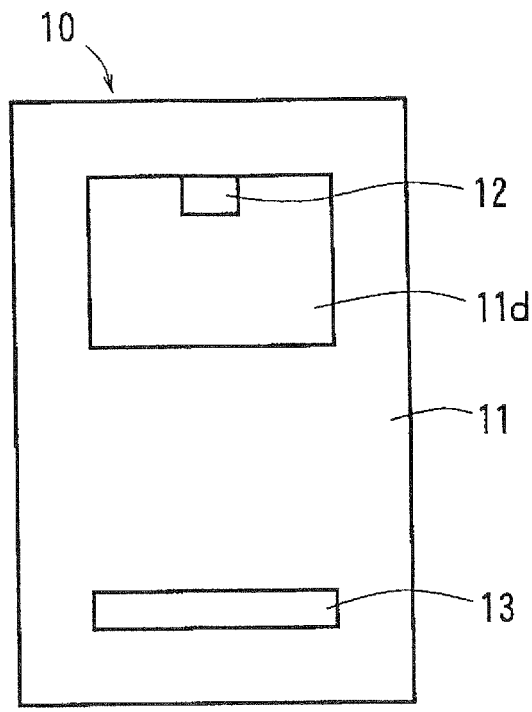
Figure 10:
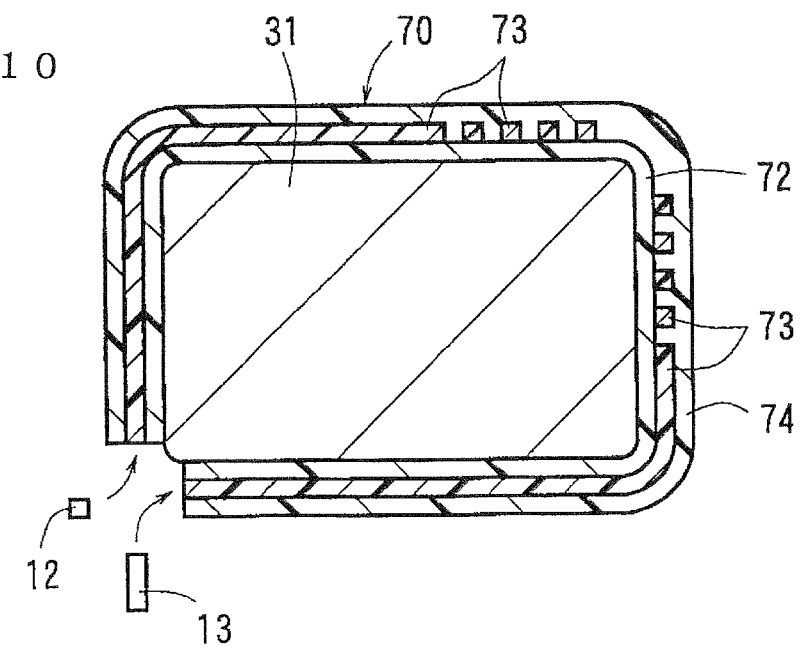
FIG. 10 is a sectional view schematically illustrating a touch panel employing a prior art optical waveguide.

As shown in FIGS. 9(a) and 9(b), the mount member 10 of this embodiment includes a substrate 11 having a rectangular shape as seen from the front side, and a base 11d of a rectangular solid shape projecting from an inward surface portion of the substrate 11. The light emitting means 12 is fixed to a surface of the base 11d at a middle of one edge of the base 11d. The position of the light emitting means 12 is determined such that the light emitting means 12 is positioned in opposed relation to the proximal end faces of the light emitting cores 3 when the mount member 10 is mounted on the optical waveguide W. Further, the light receiving means 13 is fixed to a predetermined surface portion of the substrate 11 not provided with the base 11d. The position of the light receiving means 13 is determined such that the light receiving means 13 is positioned in opposed relation to the proximal end faces of the light receiving cores 3 when the mount member 10 is mounted on the optical waveguide W. In this state, the light emitting direction of the light emitting means 12 extends parallel to the surface of the substrate 11 toward one end of the substrate 11 (as indicated by an arrow A), and the light incident direction of the Light receiving means 13 extends parallel to the surface of the substrate 11 toward the other end of the substrate 11 (as indicated by a narrow B). Examples of the substrate 11 include a metal plate such as a stainless steel plate formed with an insulative layer, a silicon wafer formed with an insulative layer, and a glass epoxy substrate. The substrate 11 has dimensions of, for example, 5 to 40 mm (width)×5 to 40 mm (length)×0.1 to 3 mm (thickness). The base 11d of the rectangular solid shape has dimensions of, for example, 1 to 20 mm (width)×1 to 20 mm (length)×5 to 10 mm (height).

As shown in FIGS. 8(a) and 8(b), the mount member 10 is mounted on the elongated optical waveguide W by applying the fixing agent 20 composed of the same material as the over-cladding layers 4 or an adhesive on surface portions of the over-cladding layers 4 adjacent to the opening of the recess 5, then inserting the light emitting means 12, the base 11d and the light emitting means 13 of the mount member 10 into the recess 5, and bringing a peripheral surface portion of the substrate 11 of the mount member 10 into abutment against the fixing agent 20. At this time, the light emitting surface of the light emitting means 12 and the light receiving surface of the light receiving means 13 are brought into opposed relation to the proximal end faces of the light emitting cores 3 and the proximal end faces of the light receiving cores 3, respectively, facing to the wall surfaces of the recess 5 with the intervention of the parts of the over-cladding layers 4. Then, the fixing agent 20 is cured to fix the mount member 10 to the optical waveguide W. In this manner, the elongated optical waveguide device shown in FIGS. 8(a) and 8(b) is obtained. Thus, the mount member 10 can be easily and properly mounted in the recess 5. The base 11d of the mount member 10 typically has the same width as the recess 5. Thus, the light emitting means 12 and the light receiving means 13 are automatically positioned in opposed relation to the proximal end faces of the light emitting cores 30 and the proximal end faces of the light receiving cores 30, respectively, when the base 11d is inserted into the recess 5.

In the embodiments described above, the distal ends 3a, 3b of the cores 3 are exposed, but may be covered with the over-cladding layers 4. In this case, the distal ends 3a, 3b of the cores 3 and edge portions of the over-cladding layers 4 (which respectively cover the distal ends 3a and 3b) may each have a lens shape so as to suppress divergence of emitted light and to converge incident light. In the embodiments described above, the proximal end faces of the cores 3 are covered with the parts of the over-cladding layers 4 in the recess 5 in which the mount member 10 is mounted (or the wall surfaces of the recess 5 are defined by the parts of the over-cladding layers 4), but the proximal end faces of the cores 3 may be exposed with the wall surfaces of the recess 5 uncovered with the over-cladding layers 4.

In the embodiments described above, the formation of the under-cladding layer 2 and the over-cladding layers 4 is achieved through the exposure/development process by using the photosensitive resin as the materials, but may be achieved in other ways. For example, a thermosetting resin such as a polyimide resin or an epoxy resin may be used as the materials for the under-cladding layer 2 and the over-cladding layers 4. In this case, the formation of the under-cladding layer 2 and the over-cladding layers 4 may be achieved by applying a varnish prepared by dissolving the thermosetting resin in a solvent, and curing the varnish by a heat treatment (typically at 300° C. to 400° C. for 60 to 180 minutes).

In the embodiments described above, the under-cladding layer 2 is formed by using the photosensitive resin, but otherwise a resin film may be used as the under-cladding layer 2. Further, a substrate formed with a metal film or a metal thin film may be used instead of the under-cladding layer 2. In this case, the surface of the metal material serves as a reflection surface on which light transmitted through the cores 3 is reflected.

Where a film is used as the base 1 in the production of the optical waveguide W, the base 1 may be separated from the under-cladding layer 2 after the elongated optical waveguide is cut out together with the film base 1, or the optical waveguide W may be used together with the base 1 without the separation of the base 1.

Next, inventive examples will be described in conjunction with comparative examples. However, it should be understood that the invention be not limited to the examples.

EXAMPLES

Mount Member of Example 1

A mount member as shown in FIGS. 3(a) and 3(b) was produced. First, a VCSEL (0.3 mm (width)×0.3 mm (length)× 0.2 mm (thickness)) was prepared as light emitting means, and an ASIC (4 mm (width)×2 mm (length)×1 mm (thickness), and a light receiving height of 0.1 mm) was prepared as light receiving means. Then, a substrate (including a stainless steel plate having a thickness of 0.023 mm and an insulative layer having a thickness of 0.015 mm, and having a total thickness of 0.038 mm) was pressed to provide a rectangular substrate having dimensions of 4 mm (width)×10 mm (length) In turn, wirings for driving the VCSEL and the ASIC in synchronism, a pad for the mounting of the VCSEL and a pad for the mounting of the ASIC were formed on a surface of the insulative layer of the substrate by photolithography. Subsequently, the VCSEL and the ASIC were mounted on and fixed to the respective pads.

Mount Member of Example 2

A mount member as shown in FIGS. 7(a) and 7(b) was produced. First, a VCSEL and an ASIC were prepared as in Example 1. Then, a substrate (including a stainless steel plate having a thickness of 0.023 mm and an insulative layer having a thickness of 0.015 mm, and having a total thickness of 0.038 mm) was pressed to provide a rectangular substrate having dimensions of 8 mm (width)×20 mm (length) and including through-holes formed in four corners as each having an inner diameter of 1 mm and two open-square cut-away portions (having a cut width of 0.1 mm) provided in a center portion thereof. Tongues respectively defined by the open-square cut-away portions each had a width of 4 mm and a length of 4 mm. In turn, wirings for driving the VCSEL and the ASIC in synchronism, a pad for the mounting of the VCSEL and a pad for the mounting of the ASIC were formed on a surface of the insulative layer of the substrate by photolithography. Subsequently, the VCSEL and the ASIC were mounted on and fixed to the respective pads.

Mount Member of Example 3

A mount member as shown in FIGS. 9(a) and 9(b) was produced. First, a VCSEL and an ASIC were prepared as in Example 1. Then, a substrate (including a stainless steel plate having a thickness of 1.5 mm and an insulative layer having a thickness of 0.015 mm, and having a total thickness of 1.515 mm) was pressed to provide a rectangular substrate having dimensions of 8 mm (width)×10 mm (length) and formed with a base (6 mm (width)×3 mm (length)×3.7 mm (height)) projecting therefrom. In turn, wirings for driving the VCSEL and the ASIC in synchronism, a pad for the mounting of the VCSEL and a pad for the mounting of the ASIC were formed on a surface of the insulative layer of the substrate by photolithography. Subsequently, the VCSEL and the ASIC were mounted on and fixed to the respective pads.

Examples 1 to 3

Material for Under-Cladding Layer and Over-Cladding Layers

A material for an under-cladding layer and over-cladding layers was prepared by mixing 35 parts by weight of bisphenoxyethanolfluorene glycidyl ether (Component A) represented by the following general formula (1), 40 parts by weight of 3',4'-epoxycyclohexylmethyl-3,4-epoxycyclohexane carboxylate which is an alicyclic epoxy resin (CELLOXIDE 2021P manufactured by Daicel Chemical Industries, Ltd.)(Component B), 25 parts by weight of (3',4'-epoxycyclohexane)methyl-3',4'-epoxycyclohexyl-carboxylate(CELLOXIDE 2081 manufactured by Daicel Chemical Industries, Ltd.) (Component C), and 2 parts by weight of a 50% propione carbonate solution of 4,4'-bis[di(β-hydroxyethoxy)phenylsulfinio]phenylsulfide bishexafluoroantimonate (Component D).

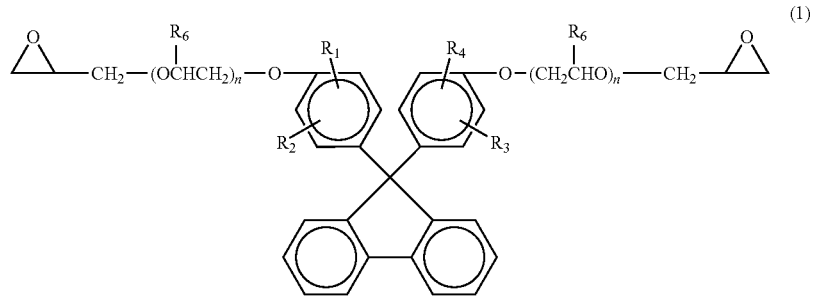

(1)

wherein $R_1$ to $R_6$ are hydrogen atoms, and $n=1$.

Material for Cores

A material for cores was prepared by dissolving 70 parts by weight of Component A, 30 parts by weight of 1,3,3-tris{4-[2-(3-oxetanyl)]butoxyphenyl}butane and 1 part by weight of Component D in 28 parts by weight of ethyl lactate.

Production of Optical Waveguide

The under-cladding layer material was applied onto a surface of a polyethylene naphthalate (PEN) film (300 mm×300 mm×188 μm (thickness)) by a spin-coating method, and then exposed to ultraviolet radiation at 2000 mJ/cm² via a synthetic quartz-based chromium mask (exposure mask) formed with a 250 mm×8 mm rectangular opening. Subsequently, a heat treatment was performed at 100° C. for 15 minutes. Thus, an under-cladding layer was formed The under-cladding layer had a thickness of 500 μm as measured by a contact film thickness meter. Further, the under-cladding layer had a refractive index of 1.502 at a wavelength of 830 nm.

Then, the core material was applied onto a surface of the under-cladding layer by a spin-coating method, and dried at 100° C. for 15 minutes. In turn, a synthetic quartz-based chromium mask (exposure mask) formed with an opening pattern conformable to a core pattern (with no core present on a predetermined longitudinally middle portion) was placed above the resulting core material film. After the core material film was exposed to ultraviolet radiation emitted from above at 4000 mJ/cm² by a contact exposure method, a heat treatment was performed at 120° C. for 15 minutes. Subsequently, a development process was performed by using a γ-butyrolactone aqueous solution to dissolve away unexposed portions, and then a heat treatment was performed at 120° C. for 30 minutes. Thus, cores were formed. Intermediate portions of the cores each had a sectional area of 15 μm (width)×24 μm (height) as measured by an SEM (scanning electron microscope). The cores each had a refractive index of 1.588 at a wavelength of 830 nm.

Subsequently, a quartz molding die for formation of over-cladding layers was prepared. The molding die had a recess having a molding surface conformable to the surface geometry of the over-cladding layers (spaced by the longitudinally middle portion) and having a depth of 1 mm. Then, the molding die was brought into intimate contact with the surface of the base with an opening of the recess thereof being properly positioned. In this state, the over-cladding layer material was injected into a molding cavity from an injection port provided in the molding die, and then exposed to ultraviolet radiation at 2000 mJ/cm² through the molding die. The resulting product is demolded, and then heat-treated at 150° C. for 60 minutes. Thus, the over-cladding layers were formed. The over-cladding layers each had a thickness of 476 μm as measured from the surfaces of the cores by observing sections of the over-cladding layers by a microscope. Further, the over-cladding layers each had a refractive index of 1.502 at a wavelength of 830 nm.

Thus, a recess was formed on the longitudinally middle portion with its bottom defined by a surface portion of the under-cladding layer and with its wall surfaces defined by opposed end faces of the over-cladding layers. The recess had dimensions of 4 mm (width)×5 mm (length)×500 μm (depth). In Example 2, four posts (each having an outer diameter of 1 mm and a height of 1 mm) were formed on surface portions of the over-cladding layers adjacent to an opening of the recess. The formation of the posts was achieved by using a quartz molding die having post formation portions in its molding surface for the formation of the over-cladding layers.

Mounting of Mount Member of Example 1 on Optical Waveguide

The substrate of the mount member was flexed with the VCSEL and the ASIC facing outward and, in this state, inserted into the recess present on the longitudinally middle portion of the optical waveguide. At this time, the light emitting surface of the VCSEL and the light receiving surface of the ASIC were brought into opposed relation to the proximal end faces of the light emitting cores and the proximal end faces of the light receiving cores, respectively, facing to the wall surfaces of the recess. Then, the same material as the over-cladding layer material was applied to peripheral portions of the VCSEL and the ASIC, and then cured by irradiation with ultraviolet radiation, whereby the mount member was fixed to the optical waveguide. Thus, an elongated optical waveguide device of Example 1 was obtained.

Mounting of Mount Member of Example 2 on Optical Waveguide

With the VCSEL and the ASIC of the mount member facing toward the recess, the posts on the over-cladding layers were inserted into the through-holes of the substrate of the mount member, and then the tongues each defined by the open-square cut-away portions are bent in the recess, whereby the light emitting surface of the VCSEL and the light receiving surface of the ASIC were brought into opposed relation to the proximal end faces of the light emitting cores and the proximal end faces of the light receiving cores, respectively, facing to the wall surfaces of the recess. In turn, the same material as the over-cladding layer material was applied to peripheral portions of the VCSEL and the ASIC, and then cured by irradiation with ultraviolet radiation, whereby the mount member was fixed to the optical waveguide. Thus, an elongated optical waveguide device of Example 2 was obtained.

Mounting of Mount Member of Example 3 on Optical Waveguide

After the same material as the over-cladding layer material was applied to a thickness of 3.5 mm on surface portions of the over-cladding layers adjacent to an opening of the recess, the VCSEL, the base and the ASIC of the mount member were inserted in the recess, and the substrate of the mount member was brought into contact with the applied material. At this time, the light emitting surface of the VCSEL and the light receiving surface of the ASIC were brought into opposed relation to the proximal end faces of the light emitting cores and the proximal end faces of the light receiving cores, respectively, facing to the wall surfaces of the recess. In turn, the applied material was cured by irradiation with ultraviolet radiation, whereby the mount member was fixed to the optical waveguide. Thus, an elongated optical waveguide device of Example 3 was obtained.

Upon the production of the optical waveguide devices of Examples 1 to 3, the alignment between the light emitting cores and the VCSEL and the alignment between the light receiving cores and the ASIC were achieved. Therefore, there was no need to perform the alignment operation after the optical waveguide devices were each wrapped around the periphery of a touch panel display.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

What is claimed is:

1. A touch panel optical waveguide device comprising:
   a plurality of light emitting cores provided on a surface of an elongated base and extending in juxtaposed relation from a predetermined longitudinally middle portion of the base toward one of opposite ends of the base, and each having a proximal end and a distal end;
   a plurality of light receiving cores provided on the surface of the elongated base and extending in juxtaposed relation from the longitudinally middle portion of the base toward the other end of the base, and each having a proximal end and a distal end;
   the proximal ends of the light emitting cores being spaced from the proximal ends of the light receiving cores by the longitudinally middle portion of the base;
   the distal ends of the light emitting cores and the distal ends of the light receiving cores being positioned on one longitudinal side edge of the base;
   an over-cladding layer provided on the surface of the base except for the longitudinally middle portion as covering the light emitting cores and the light receiving cores; and
   a mount member including light emitting means and light receiving means fixed to a single substrate;
   the mount member being fixed in a recess defined on the longitudinally middle portion of the base;
   the light emitting means being opposed to proximal end faces of the light emitting cores;
   the light receiving means being opposed to proximal end faces of the light receiving cores.

2. A touch panel optical waveguide device as set forth in claim 1, wherein the base is composed of an under-cladding layer material or a metal material.

3. A production method for a touch panel optical waveguide device as recited in claim 1, the production method comprising the steps of:
   forming a plurality of light emitting cores and a plurality of light receiving cores on a surface of an elongated base, the light emitting cores extending in juxtaposed relation from a predetermined longitudinally middle portion of the base toward one of longitudinally opposite ends of the base and each having a proximal end and a distal end, the light receiving cores extending in juxtaposed relation from the longitudinally middle portion of the base toward the other end of the base and each having a proximal end and a distal end, the proximal ends of the light emitting cores being spaced from the proximal ends of the light receiving cores by the longitudinally middle portion of the base, the distal ends of the light emitting cores and the distal ends of the light receiving cores being positioned on one longitudinal side edge of the elongated base;
   forming an over-cladding layer on the surface of the base except for the longitudinally middle portion to cover the light emitting cores and the light receiving cores;
   preparing a mount member including light emitting means and light receiving means fixed to a single substrate;
   fixing the mount member in a recess defined on the longitudinally middle portion of the base so that the light emitting means is opposed to proximal end faces of the light emitting cores and the light receiving means is opposed to proximal end faces of the light receiving cores.

4. A production method for a touch panel optical waveguide device as recited in claim 2, the production method comprising the steps of:
   forming a plurality of light emitting cores and a plurality of light receiving cores on a surface of an elongated base, the light emitting cores extending in juxtaposed relation from a predetermined longitudinally middle portion of the base toward one of longitudinally opposite ends of the base and each having a proximal end and a distal end, the light receiving cores extending in juxtaposed relation from the longitudinally middle portion of the base toward the other end of the base and each having a proximal end and a distal end, the proximal ends of the light emitting cores being spaced from the proximal ends of the light receiving cores by the longitudinally middle portion of the base, the distal ends of the light emitting cores and the distal ends of the light receiving cores being positioned on one longitudinal side edge of the elongated base;

forming an over-cladding layer on the surface of the base except for the longitudinally middle portion to cover the light emitting cores and the light receiving cores;

preparing a mount member including light emitting means and light receiving means fixed to a single substrate;

fixing the mount member in a recess defined on the longitudinally middle portion of the base so that the light emitting means is opposed to proximal end faces of the light emitting cores and the light receiving means is opposed to proximal end faces of the light receiving cores.

* * * * *